(12) United States Patent
Onodera et al.

(10) Patent No.: US 6,237,713 B1
(45) Date of Patent: *May 29, 2001

(54) ELECTRIC POWER STEERING UNIT

(75) Inventors: Tsugio Onodera, Azuma-mura; Tadao Kodaira, Maebashi; Yoshiaki Taniguchi, Kiryu, all of (JP)

(73) Assignee: Mitsuba Corporation, Gunma (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/925,030

(22) Filed: Sep. 8, 1997

(30) Foreign Application Priority Data

Sep. 24, 1996 (JP) .................................. 8-252048

(51) Int. Cl.[7] ...................................................... B62D 5/04
(52) U.S. Cl. ............................................ 180/444; 180/443
(58) Field of Search ................................... 180/427, 428, 180/443, 444; 74/424.6, 424.8 R

(56) References Cited

U.S. PATENT DOCUMENTS 4,666,014  5/1987  Carlson et al. ...................... 180/148
5,437,349  8/1995  Kurahashi et al. .................. 180/79.1
5,796,198 *  8/1998  Sugino et al. ......................... 310/89

FOREIGN PATENT DOCUMENTS 0 133 003     2/1985  (EP) ................................. B62D/5/04
0 673 827 A1  9/1995  (EP) ................................. B62D/5/04

* cited by examiner

Primary Examiner—Daniel G. DePumpo
(74) Attorney, Agent, or Firm—McCormick, Paulding & Huber LLP

(57) ABSTRACT

A power steering unit according to the invention scarcely transmits sounds and vibrations coming from the electric motor to the steering wheel of a motor vehicle. It comprises a rack-shaft 2 to be coupled to the guiding wheels of a vehicle, a housing A for slidably containing the rack-shaft 2 and holding therein a coupling section 6 for causing the teeth of the rack-shaft 2 to engage those of a pinion arranged on the steering column 5 linked to the steering handle of the vehicle and an electric motor 1 coaxially arranged around the rack-shaft 2, which the rotary force is transmitted to the rack-shaft 2 by way of a ball screw mechanism 3 as the steering assisting power. It further comprises another housing B, for rotatably supporting the nut section of the ball-and-screw mechanism 3, the housing B being provided with a fitting section to be secured to the vehicle main body. The housing A is secured to the vehicle main body by a bracket 9, while the housing B is secured to the vehicle main body by a fitting section 10.

3 Claims, 4 Drawing Sheets

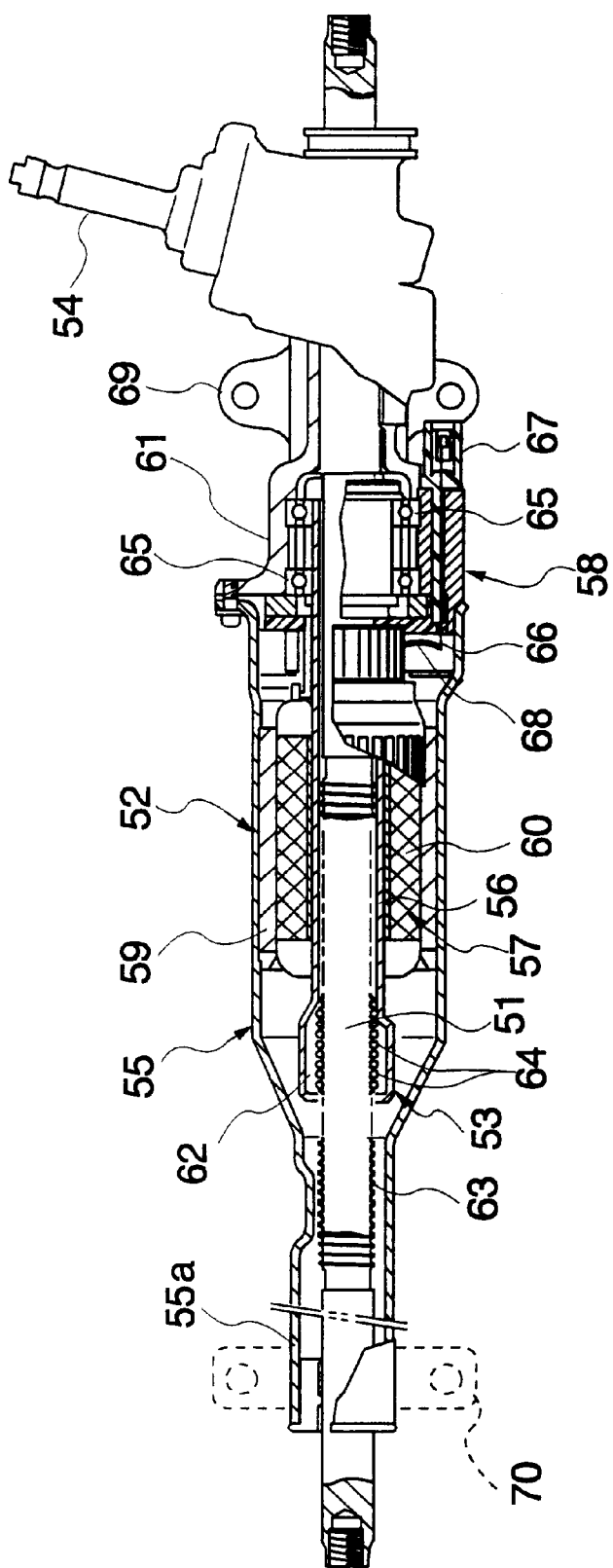
Fig. 5 *(PRIOR ART)*

ELECTRIC POWER STEERING UNIT

BACKGROUND OF THE INVENTION

1. Field of the Invention

This invention relates to an electric power steering unit to be used for a vehicle and, more particularly, it relates to a field of technology effectively applicable to electric power steering gears to be used for rack and pinion type steering systems.

2. Related Art Statement

In recent years, most vehicles are equipped with a so-called power steering gear, and various type power steering unit, such as a hydraulically or electrically operated type power steering unit has been designed to assist the steering power of the vehicle. In these electric power steering units, as one for applicable to rack and pinion type steering systems, a unit which the steering assisting power is obtained by an electric motor arranged coaxially with a rack-shaft, as Japanese Patent Application Laid-Open No. 8-98451, is known.

Such an electric power steering unit shown in FIG. 5, comprises an electric motor 52 arranged coaxially with a rack-shaft 51 so that the steering assisting power generated by the electric motor 52 is transmitted to the rack-shaft 51 by way of a ball screw mechanism 53. Then, the guiding wheels of the vehicle can be turned by utilizing both the manual steering power of the driver and the steering assisting power.

The rack-shaft 51 is linked to the guiding wheels (which hereinafter may simply be referred to as "the wheels") typically by way of tie rods or knuckle arms arranged at the respective opposite ends thereof and also linked to the steering column 54 that is coupled to the steering wheel (which hereinafter may be referred to as "the handle") by way of a rack and pinion gear so that it may be reciprocatively moved in the horizontal directions of FIG. 5 as the steering operation by the driver. The electric motor 52 has a cylindrical yoke 55 containing coaxially therein a cylindrical armature shaft 56 and a field device 57 and is fed with power from a power supply section 58. The field device 57 comprises magnets 59 arranged on the inner peripheral portion of the yoke 55 and an armature core 60 arranged on the outer peripheral portion of the armature shaft 56. The rotary power generated by the electric motor 52 is transmitted to the rack-shaft 51 by way of a ball screw mechanism 53 arranged at the left end of the armature shaft 56 in FIG. 5. Note that the armature shaft 56 is supported at a right side portion thereof by an angular bearing 65 held within housing 61.

The ball screw mechanism 53 has a well known constitution, which comprises a large number of balls 64 arranged between a nut section 62 and a screw section 63 thereof, the nut section 62 being press-fit into and caulked against the armature shaft 56. With this arrangement, the rotary power of the electric motor 53 is transmitted to the rack-shaft 51 by way of the nut section 62, the balls 64 and the screw section 63 to produce axial reciprocative power there, which is then used to assist the steering power.

A power steering unit having the above described configuration is then mounted onto the vehicle by securely fitting the housing 61 on the right side of FIG. 5 to the vehicle main body and fitting the yoke 55 on the left side of FIG. 5 by a bracket 70 as in the case of a hydraulic power steering unit. More specifically, the housing 61 is directly fitted to the vehicle by securing a fitting section 69 that is an integral part of the housing 61 to the vehicle main body by means of screws. On the other hand, the yoke 55 is fitted to the vehicle by holding the end of a pipe-shaped diametrically small portion 55a (on the left side in FIG. 5) of the yoke 55 under the bracket 70 having a U-shaped cross section at a middle portion thereof. Note that an elastic member (not shown) typically made of rubber is arranged around the diametrically small portion 55a of the yoke 55 so that the yoke 55 is held under the U-shaped area of the bracket 70 with the elastic member disposed therebetween. The strength with which the unit is secured largely depends on the strength of securing the housing 61 because the housing 61 is by far securer than the bracket 70 when fitted to the vehicle main body.

A hydraulic power steering unit typically comprises a combination of pipe-shaped member and a housing, the housing being located close to the steering column. Since, unlike the housing, it is not possible to provide the pipe-shaped member with a fitting section, the member has to be secured in position by means of a bracket. If, on the other hand, the housing is secured by means of a bracket, the pipe-shaped member is required to show an enhanced strength when fitted in position and a further housing has to be located at the side of the pipe-shaped member for the sake of the strength. Thus, with a hydraulic power steering unit, it is the most common practice to rigidly secure the housing to the vehicle main body and hold the pipe-shaped member in position by means of a bracket because this technique is advantageous particularly in terms of cost and this practice is normally followed by electric power steering units.

As described above, with a conventional power steering unit, a component thereof located close to the steering column 54 of the motor vehicle, that is, the housing 61 is rigidly and directly secured to the vehicle main body. However, while such a constitution shows a greater holding strength than when it is secured by means of a bracket, it is then less apt to damp the sounds and vibrations transmitted to it from the vehicle main body. Therefore, a power steering unit shown in FIG. 5 is accompanied by a problem that it cannot damp the controlling sounds and vibrations of the electric motor 52 and hence they may be easily transmitted to the steering column 54. It would be appreciated that, while the noises generated outside the motor vehicle are apt to be drowned by the sounds of the moving vehicle and its engine so that they may provide less nuisance to the passengers in the vehicle, the sounds and vibrations transmitted to the steering column 54 can then be conveyed to the inside of the vehicle by way of the steering wheel. Therefore, the sounds are confined in the room of the vehicle and they give nuisances to the driver and passengers in the vehicle and possibly interfere with the steering feeling of the driver.

Additionally, since a conventional housing 61 as shown in FIG. 5 has a fitting section 69 projecting in a direction that is three-dimensionally different from the projecting direction of the member that holds the steering column 54 so that a costly mold having a complicated cavity profile has to be used for manufacturing the housing to push up the manufacturing cost.

Still additionally, motor vehicles of different types have different positions for securing the power steering unit to the vehicle main body. Therefore, since the fitting section 69 of the housing 61 is fixed, different housings in which the position of the fitting section 69 is different from each other should be prepared for motor vehicles of different types corresponding to the securing position. This means that different types of motor vehicle require different complicated molds and many kinds of products is required for each types. Accordingly, the management of the products is very troublesome and it raises the manufacturing cost of the unit.

An object of the present invention is to provide an electric power steering unit that can effectively prevent the sounds and vibrations of its electric motor from being transmitted to the steering wheel.

Another object of the present invention is to provide an electric power steering unit which can simplify the cavity profile of the molds and allow the housing of the steering column side to be commonly used in motor vehicles of different types.

The above-described and other objects, and novel feature of the present invention will become apparent more fully from the description of the following specification in conjunction with the accompanying drawings.

SUMMARY OF THE INVENTION

According to the invention, there is provided an electric power steering unit comprising a rack-shaft to be coupled to the guiding wheels of a vehicle, a first housing for slidably containing the rack-shaft and holding therein a coupling section for causing the teeth of the rack-shaft to engage those of a pinion arranged on the steering column linked to the steering handle of the vehicle, an electric motor coaxially arranged around the rack-shaft to supply assisting power to the rack-shaft and a ball screw mechanism for connecting a nut section linked to the armature shaft of the electric motor with a screw section formed on the rack-shaft by disposing ball members therebetween and for transmitting the rotary power of the electric motor to the rack-shaft as assisting power for steering. And the unit further comprises a second housing for rotatably supporting the nut section of the ball-and-screw mechanism, the second housing being provided with a fitting section to be secured to the vehicle main body. The first housing being secured to the vehicle main body by means of a fitting member separate from the first housing, the second housing being secured to the vehicle main body by means of the fitting section.

BRIEF DESCRIPTION OF THE DRAWINGS

FIG. 5 is a schematic cross sectional view of a conventional power steering unit, showing its overall configuration.

DESCRIPTION OF THE PREFERRED EMBODIMENT

Figure 1:
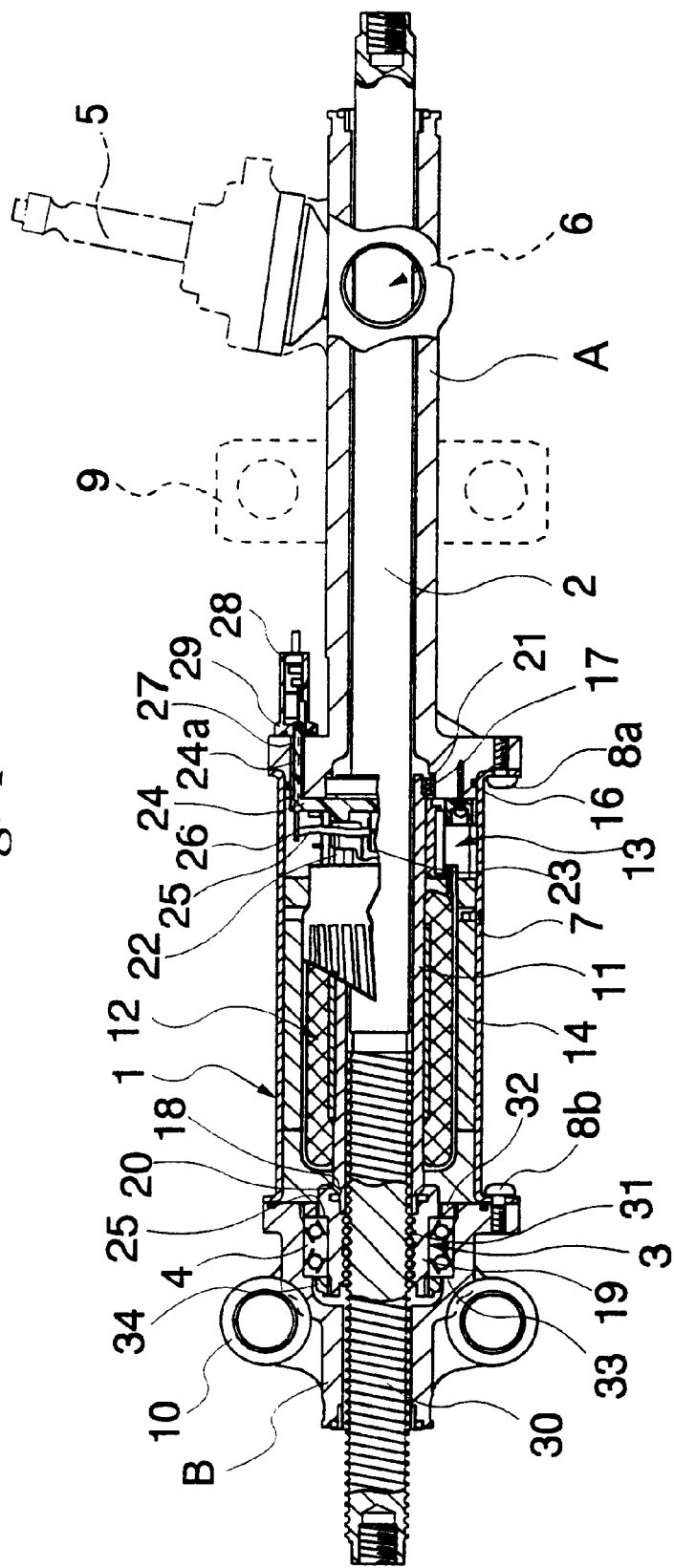
FIG. 1 is a schematic cross sectional view of an embodiment of power steering unit according to the invention, showing its overall configuration.
Figure 2:
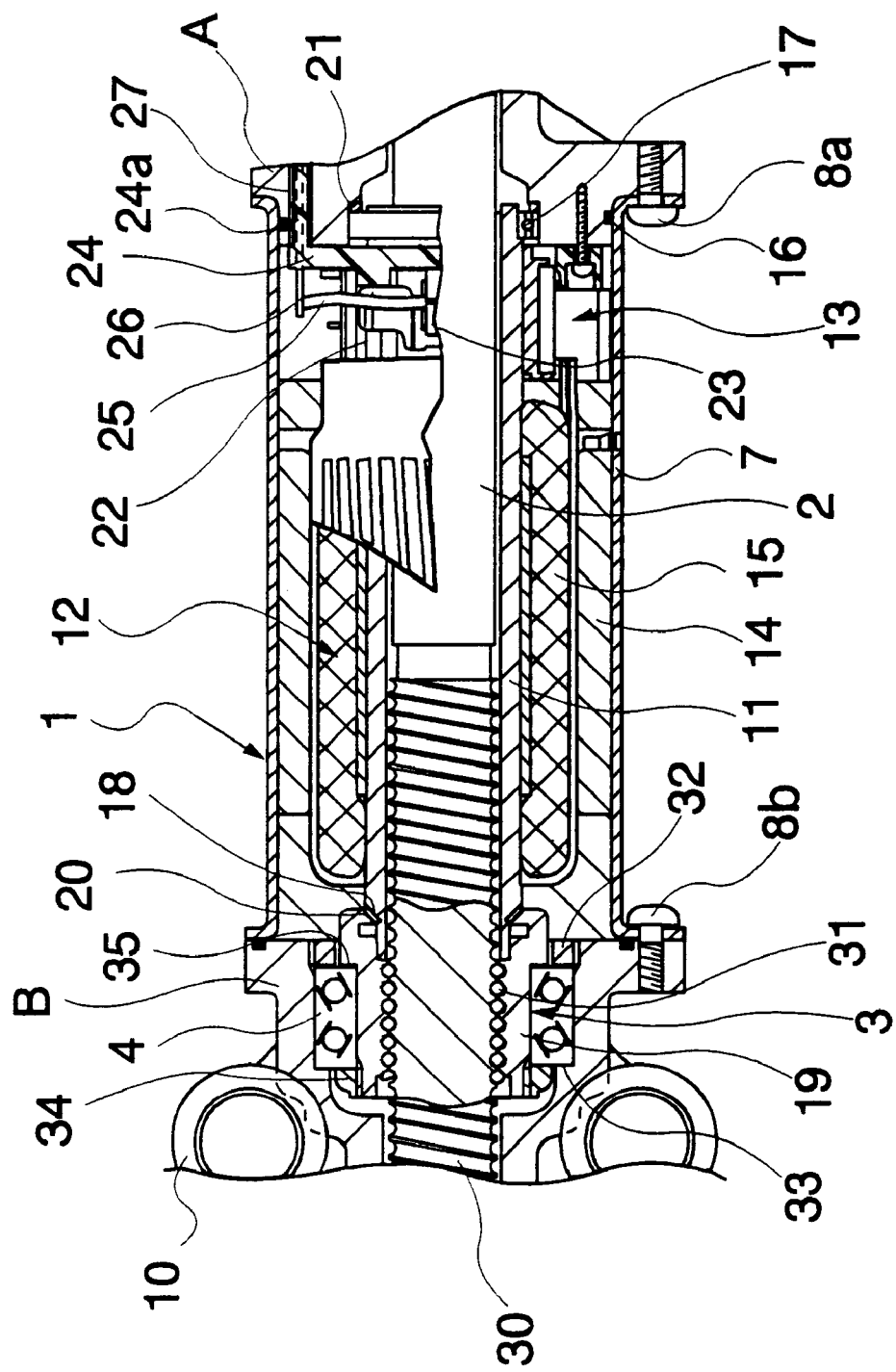
FIG. 2 is an enlarged cross sectional partial view of the embodiment of power steering unit of FIG. 1, showing its principal area.
Figure 3:
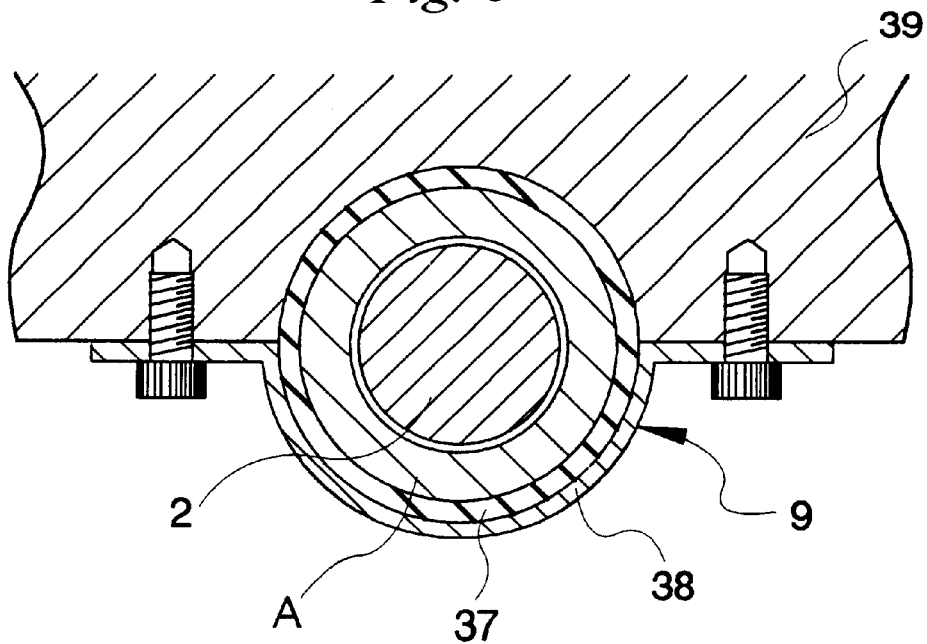
FIG. 3 is a cross sectional view of showing a state of securing the housing A to the vehicle main body by means of a bracket.

Now, the invention will be described in greater detail by referring to the accompanying drawings that illustrate preferred embodiments of the invention. FIG. 1 is a schematic cross sectional view of an embodiment of electric power steering unit according to the invention, showing its overall configuration. FIG. 2 is an enlarged cross sectional partial view of the embodiment of power steering unit of FIG. 1, showing its principal area.

As seen from FIGS. 1 and 2, the electric power steering unit (hereinafter referred to as "power steering unit") is provided with an electric motor 1 having a hollow central area and arranged around a rack-shaft 2 as in the case of the conventional power steering units shown in FIG. 5 and, for example, the unit is fitted to the steering gear of the wheels of a vehicle that are typically the front wheels. The steering assisting power generated by the electric motor 1 is transmitted to the rack-shaft 2 via a ball screw mechanism 3 to reduce the physical load for steering the vehicle on the part of the driver.

As shown in FIG. 1, the power steering unit further comprises a housing A (first housing) and a housing B (second housing), which are securely coupled to yoke 7 of the electric motor 1 by means of a plurality of respective screws 8a and 8b, and the rack-shaft 2 is arranged in them in such a way that it may be moved to the right and the left direction in FIG. 1. Then, the wheels are linked to the respective ends of the rack-shaft 2 by means of tie rods or knuckle arms so that the wheels may be steered to a desired direction by slidingly moving the rack-shaft 2.

The housing A of the embodiment of power steering unit is securely fitted to the vehicle main body 39 by means of a bracket (fitting member) 9 having a U-shaped profile for a central portion thereof. The peripheral wall of the housing A is surrounded by an elastic member 37 typically made of rubber so that the housing A is received in the U-shaped recess of the bracket 9 with the elastic member 37 disposed therebetween.

On the other hand, the housing B is fitted to the vehicle main body by securing its fitting section 10 to the latter by means of screws with an elastic member disposed between the vehicle main body and the housing B. In this power steering unit, unlike the conventional power steering unit of FIG. 5, the housing A of this embodiment located closer to the steering column is held by a bracket, whereas the housing B remote from the steering column is directly secured to the vehicle main body. The housing B is mainly responsible for the strength required for securing.

Now, some of the principal components of the embodiment will be described. Firstly, the housing A is a hollow member typically made of cast iron or die-cast aluminum and fitted to the vehicle main body by means of a bracket 9 as described above. A coupling section 6 is arranged at the right side end of the unit in FIG. 1 for coupling the rack-shaft 2 with the steering column 5 of the vehicle that is further linked to the steering wheel. In this coupling section 6, a pinion (not shown) arranged on the steering column 5 and the teeth of a rack arranged on the outer side portion of the rack-shaft 2 are engaged with each other so that the rotary motion of the steering column 5 is converted into a reciprocative motion of the rack-shaft 2 that moves right and left direction in FIG. 1. A torque sensor (not shown) is arranged on the coupling section 6 to detect the torque of the steering column 5 so that the power output of the electric motor 1 may be controlled as a function of the detected torque.

With the above described arrangement of the embodiment power steering unit, there may arise a fear that the rigidity of the steering column 5 may not be sufficient because the housing A is not rigidly secured to the vehicle main body. However, it should be appreciated that with this embodiment, approximately 90% of the power necessary for steering the motor vehicle is supplied by the electric motor 1 and only 10% of the steering power is applied to the coupling section 6 so that such a high coupling rigidity is not required for the coupling section 6 and the bracket 9 can sufficiently hold the housing A to the steering column 5.

The electric motor 1 has a cylindrical yoke 7 containing coaxially therein a cylindrical armature shaft 11 and a field device 12. The rack-shaft 2 is assembled to run through the inside of the armature shaft 11 and has a simplified profile if compared with its counterpart of the conventional unit in FIG. 5.

The field device 12 comprises a plurality of magnets 14 arranged on the inner peripheral surface of the yoke 7 and an armature core 15 arranged on the outer peripheral portion of the armature shaft 11 and is fed with electric power from a power supply section 13.

The yoke 7 is a hollow and cylindrical member made of iron and having a profile of a cylindrical pipe with a substantially constant thickness. It contains therein the field device 12 and the power supply section 13. The yoke 7 is securely and airtightly connected to the housing A at the right side end thereof in FIG. 1 by means of a plurality of screws 8a and an O-ring 16. On the other hand, it is securely connected to the housing B at the left side end in FIG. 1 also by means of a plurality of screws 8b.

The magnets 14 of the field device 12 operates as field poles and are arranged peripherally at regular intervals in the yoke 7. On the other hand, the armature shaft 11 is held at an end thereof (the right side end in FIGS. 1 and 2) by a bearing 17 fitted to the housing A and provided on the other end (the left side end in FIGS. 1 and 2) with a tapered spline 18, which is engaged with a corresponding spline 20 formed at an end of a nut section 19 of the ball-and-screw mechanism 3 so that the rotary motion of the armature shaft 11 is transmitted to the nut section 19.

Note that a rubber member 21 is fitted to a right side portion of the bearing 17 to urge the armature shaft 11 against the side of the nut section 19 by means of the elastic force of the rubber member 21. Thus, the spline 18 is urged against and engaged with the spline 20 so that the rotary motion of the armature shaft 11 is securely transmitted to the nut section 19. Because of the rubber member 21 arranged on the right side of the bearing 17, the armature shaft 11 is held in position but allowed to move to a small extent. Note that the rubber member 21 can be replaced by an equivalent member that may be made of any appropriate material and have any contour so long as it axially urges the armature shaft 11. For example, it may be replaced by a coned disc spring, a wave washer or a member made of synthetic resin.

The power supply section 13 is designed to feed the armature with electricity and comprises a commutator 22 rigidly secured to the armature shaft 11 and a brush 23 held in contact with the peripheral surface of the commutator 22 to provide electric contact points between them. The brush 23 is held in a brush holder formed integrally with a brush holder stay 24 that is made of synthetic resin and pressed against the commutator 22 under a predetermined pressure by means of an elastic member (not shown). On the other hand, a terminal plate 26 having an end connected to a pig tail 25 of the brush 23 by spot welding is made to run through a projecting section 24a of the brush holder stay 24 by means of an insertion molding technique. Then, the brush holder stay 24 is secured to the housing A with screws in such a way that the front end of the projecting section 24a is projecting to the outside through a hole 27 of the housing A. Thus, the terminal plate 26 projects from the housing A with the projecting section 24a of the brush holder stay 24 to form a power supply terminal.

Figure 4:
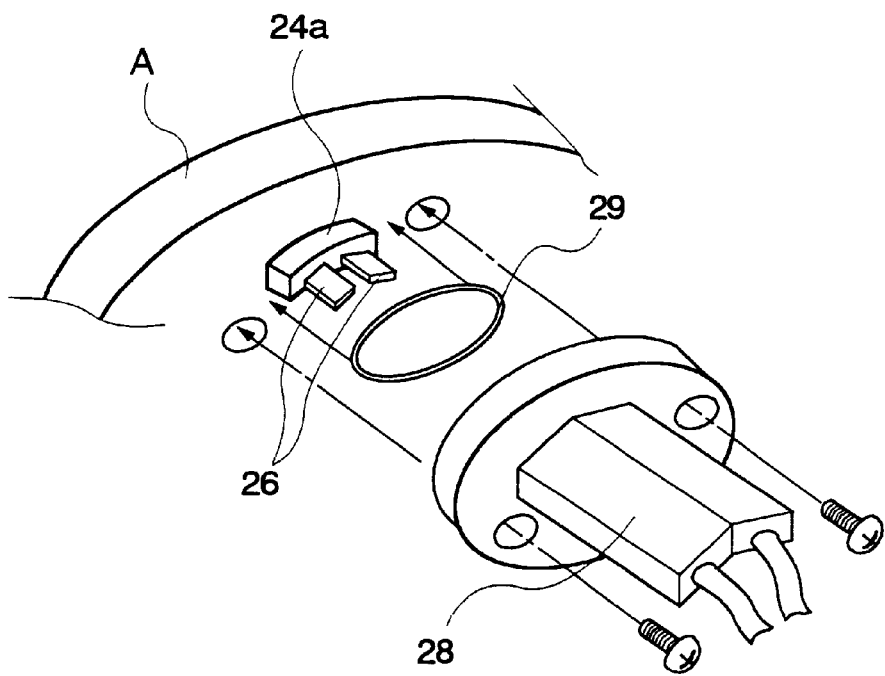
FIG. 4 is a schematic perspective view of the power supply terminal of the embodiment of FIG. 1, illustrating how a coupler is fitted thereto.

FIG. 4 is a schematic perspective view of the power supply terminal, illustrating how a coupler 28 is fitted thereto. Referring to FIG. 4, the terminal plate 26 projects to the outside of the housing A with the projecting section 24a to provide a male terminal and a waterproof female coupler 28 is secured to it by means of screws with an O-ring 29 interposed therebetween. It should be noted here that any interruption to the supply of power to the electric motor 1, if instantaneous, is not allowed from the viewpoint of assisting the manual power applied to the steering wheel by the driver for maneuvering the vehicle. Since the coupler 28 is rigidly secured to the housing A by means of screws in this embodiment of power steering unit, the coupler 28 is prevented from being unfastened to get out of power supply due to vibrations to improve the reliability of the unit.

Meanwhile, in the conventional power steering unit, the terminal is secured to the housing 61 by inserting a coupler 67 (male side) formed integrally with the terminal 66 and rigidly securing an end of the terminal 66 to a pig tail 68 of the brush as shown in FIG. 5. With this arrangement of the conventional power steering unit, the terminal 66 and the pig tail 68 are connected to each other by spot welding after fitting the coupler 67 to the housing 61. Therefore, with the conventional power steering unit, the welding operation has to be carried out by rigidly anchoring the relatively large housing 61 and it makes the operation rather cumbersome. Additionally, since the coupler 67 is not adapted to disassembling, either the housing 61 has to be replaced or the pig tail 68 and the terminal 66 have to be cut off from each other to replace the brush. In the latter case, the new brush has to be connected to the pig tail by spot welding for another time.

This embodiment employs a terminal configured in a manner as described above, thus, in this embodiment, the brush holder stay 24 and the pig tail 25 are connected with each other by spot welding so that they may collectively be handled efficiently as a subassembly. Additionally, they can be easily separated from the housing A so that only the brush holder stay 24 have to be replaced when the brush 23 is replaced. Thus, the number of components that have to be replaced for maintenance and consequently the efficiency of maintenance operation is significantly improved. Still additionally, the coupler 67 of the conventional power steering unit is omitted from this embodiment to reduce the total number of components to reduce the manufacturing cost.

The housing B is, like the housing A, a hollow member typically made of cast iron or die-cast aluminum and provided in the inside with a ball-and-screw mechanism 3. The ball-and-screw mechanism 3 per se is known and comprises a nut section 19, a screw section 30 formed on the outer peripheral wall of the rack-shaft 2 and a number of balls 31 arranged between the nut section 19 and the screw section 30. The rack-shaft 2 is supported by the nut section 19 in such a way that its rotary motion around the axis of rotation is restricted but it is reciprocated right and left direction in FIG. 1 as the nut section 19 is rotated.

The nut section 19 is axially rotatable relative to the housing B with an angular bearing 4 interposed therebetween and securely fitted to the housing B. Thus, unlike the conventional power steering unit of FIG. 5 wherein the nut section of the ball-and-screw mechanism and the angular bearing are independently arranged, the nut section 19 of the ball-and-screw mechanism 3 and the angular bearing 4 are combined to form a unitary member and arranged in the housing B that is separated from the housing A in this embodiment of power steering unit according to the invention. The angular bearing 4 is securely held between a bearing holder ring 32 screwed into an opening of the housing B and a stepped section 33 formed in the housing B to restrict its axial movement. The relative axial movement of the nut section 19 and the angular bearing 4 is restricted by another bearing holder ring 34 screwed into the left end of the nut section 19 and another stepped section 35 formed on the outer peripheral wall of the nut section 19.

On the other hand, a tapered spline 20 is formed at the right end of the inner cylindrical space of the nut section 19 and engaged with a corresponding spline 18 of the armature shaft 11. Thus, the armature shaft 11 and the nut section 19 are coupled firmly so that they can be handled as a unitary member. More specifically, the armature shaft 11 is supported by the bearing 17 and the nut section 19 and the rotary motion of the armature shaft 11 is effectively transmitted to the nut section 19. Therefore, as the armature shaft 11 rotates, the nut section 19 is rotated accordingly to reciprocatively move the rack-shaft 2 right and left direction under the effect of the ball-and-screw mechanism 3.

Note, since the rack-shaft 2 is bent by the external force typically applied to it by the wheels, a clearance considering the quantity of the bending has to be provided between the rack-shaft 2 and the armature shaft 11. Conventionally, the relationship between the quantity of the bending and the points where the rack-shaft 2 is supported is not considered and the supporting points are arbitrarily selected. As a result, the clearance has to be made excessively large to accommodate any possible bending of the rack-shaft 2 and baffle any attempt to down-size the unit. To the contrary, in view of the fact that the rack-shaft 2 is supported at two points of the ball-and-screw mechanism 3 and the coupling section 6, the bending of the rack-shaft 2 is minimized by equalizing the distances from the opposite ends of the rack-shaft 2 to the respective supporting points in this embodiment of power steering unit, provided that the rack-shaft 2 shows a same rigidity at the two supporting points. If the rack-shaft 2 shows different rigidity values at the two supporting points, the bending of the rack-shaft 2 can be minimized by appropriately selecting the supporting points, taking the ratio of the rigidity values into consideration. The clearance between the rack-shaft 2 and the armature shaft 11 can be minimized by minimizing the bending of the rack-shaft 2 to reduce the overall dimensions and hence the manufacturing cost of the unit.

Now, the embodiment of power steering unit of the invention operates in a manner as described below. Firstly, as the steering wheel is operated by the driver to turn the steering column 5 and the rack-shaft 2 is moved in the direction corresponding to the sense of rotation of the steering column 5 to carry out a necessary steering operation. At the same time, a steering torque sensor (not shown) detects the torque generated by the rotary motion of the steering column 5 and consequently the commutator 22 is supplied with electric power corresponding to the detected torque from the terminal plate 26 having the coupler 28 via the brush 23. As the electric motor 1 is driven to operate the armature shaft 11 and hence the nut section 19 coupled to it are rotated. As the nut section 19 rotates, the steering assisting power is transmitted to the rack-shaft 2 under the effect of the ball-and-screw mechanism 3, whereby the movement of the rack-shaft 2 is promoted and the steering power is assisted.

The transmission of sounds and vibrations of a steering column 5 equipped with a power steering unit having the above described configuration will be discussed by comparing the unit with a conventional power steering unit shown in FIG.5. Note that the sounds and vibrations that appear on the steering column 5 to be considered mostly come from the electric motor 1. Therefore, sounds and vibrations generated in the electric motor 1 will be discussed in the following description.

The sounds and vibrations generated in the electric motor 1 are then transmitted to and through the housing A that is rigidly held in position by means of screws 8a. As the housing A is fitted to the vehicle main body by means of a bracket 9 with an elastic member 37 disposed therebetween in this embodiment of power steering unit, the sounds and vibrations transmitted through the housing A are absorbed and damped by the elastic member 37 to damp. Therefore, the sounds and vibrations generated by the electric motor 1 are damped on the way and hence would not be efficiently transmitted to the steering column 5. To the contrary, since the fitting section 69 of a conventional power steering unit of FIG. 5 is rigidly secured to the vehicle main body, the sounds and vibrations would not be damped at the fitting section 69 and would be easily transmitted to the steering column 54.

Thus, a power steering unit according to the invention is less transmissive relative to sounds and vibrations coming from the electric motor 1 as compared with a conventional power steering unit and hence it is possible to solve the problem of interfering with the steering feeling of the driver. While sounds and vibrations coming from the electric motor 1 are discussed above, it will be appreciated that those coming from the ball-and-screw mechanism 3 and other components can also be effectively damped.

On the other hand, since the housing A of a power steering unit according to the invention is not integrally formed with a fitting section unlike its counterpart of a conventional power steering unit, the mold and the process for manufacturing it can be greatly simplified. More specifically, the housing A illustrated in FIG. 1 is devoid of any projections such as the fitting section 69 shown in FIG. 5 and hence has a simplified the constitution of the mold. Therefore, since the cost of manufacturing can be reduced, it is possible to reduce the cost of the unit.

Further, since the housing A of a power steering unit according to the invention is held in position by means of a bracket 9, its position can be appropriately selected to adapt itself to motor vehicles having different securing position of the unit. Accordingly, many kinds of different molds having a complicated profile do not have to be prepared and the management of products become easy, therefore, it is possible to reduce a unit cost of the power steering unit.

Detailed description has hereinabove been given of the invention achieved by the present inventor with reference to the embodiment. However, the present invention should not be limited to the embodiment described above, and may be variously modified within the scope not departing from the gist.

For instance, a brushless electric motor may be used for an power steering unit according to the invention. If such is the case, the field device has a core and magnets respectively arranged on the yoke side and the armature shaft side while the power supply section has a circuit board comprising conducting means and a detector for detecting the angular position of the armature shaft. Additionally, the present invention is applicable not only to front wheels steering unit but also to rear wheels steering unit having the same constitution and mounting condition as the front wheels steering unit.

Finally, while the present invention is described particularly in terms of power steering unit of motor vehicle, it may be applied to any industrial machines and vehicles provided with a steering system.

The advantages of the present invention may be summarized as follows.

(1) Since the housing (first housing) having a coupling section for linking itself to the steering column is secured by means of a bracket and the other housing (second housing) remote from the coupling section is directly secured to the vehicle main body by means of its fitting section, the controlling sounds and vibrations of the electric motor of the power steering unit are considerably prevented from being transmitted to the steering column so that they would not become nuisances to the drivers and passengers in the vehicle and interfere with the steering feeling of the driver.

(2) Since the housing (first housing) having a coupling section for linking itself to the steering column is secured by means of a bracket, the housing that is placed close to the steering column does not require a fitting section for securing it to the vehicle main body so that a mold having a simple cavity profile can be used for manufacturing the housing to reduce the cost of manufacturing.

(3) Since the housing located close to the steering column is secured by means of a bracket, it can adapt itself to vehicles of different types where it is fitted to different locations so that different types of motor vehicle may not require different housings specifically defined for them. This means that the use of various molds having a complicated cavity profile is no longer necessary so that manufactured housings can be handled in a simple manner and a unit cost of the unit can be reduced.

What is claimed is:

1. An electric power steering unit for use with a land vehicle having a main body with an inside space, a steering column communicating with the inside space and having a lower end located outside of the inside space, a steering handle on the steering column in the inside space, and guiding wheels, said unit comprising:

a rack-shaft to be coupled to the guiding wheels of the vehicle;

an elongated first housing slidably containing a portion of the rack-shaft and having at one point along its length a coupling section for coupling the first housing to the lower end of the steering column of the vehicle such that the teeth of the rack-shaft are engageable with those of a pinion arranged on the steering column and linked to the steering handle of the vehicle;

an electric motor coaxially arranged around the rack-shaft to supply assisting power to the rack-shaft;

a ball screw mechanism having a nut section drivingly connected to the armature shaft of the electric motor and also drivingly connected to a screw section formed on the rack-shaft by ball members disposed between the nut section and the screw section to transmit the rotary power of the electric motor to the rack-shaft as assisting power for steering;

a second housing having a housing part containing another portion of the rack-shaft and rotatably supporting the nut section of the ball-and-screw mechanism and being disposed at an opposite longitudinal end of the steering unit relative to the coupling section, said housing part of the second housing radially surrounding and containing said nut section and ball members, said second housing being provided with a fitting section rigidly integrally connected with the housing part and adapted for use in rigidly securing said second housing at said opposite longitudinal end of the steering unit to the main body of the vehicle so that said fitting section can rigidly fix the second housing containing said ball screw mechanism to the main body to inhibit communicating to the first housing vibration generated at said ball screw mechanism during the transmission of assisting power for steering to the rack-shaft; and, a fitting member separate from the coupling section adapted to be located adjacent the coupling section and for use in securing the first housing to the vehicle main body and including a quantity of elastic material for insertion between the first housing and the vehicle main body so that after the first housing is secured to the vehicle main body by said fitting member with said elastic material inserted between the first housing and the vehicle main body said first housing can resiliently move by way of the elastic material relative to the vehicle main body to reduce the transmission of noise from the steeling unit to the inside space of the vehicle main body through the steering column.

2. An electric power steering unit according to claim 1, wherein said fitting section is cast integrally with said second housing.

3. An electric power steering unit for use with a land vehicle having a main body with an inside space, a steering column communicating with the inside space and having a lower end outside of the inside space, a steering handle on the steering column in the inside space, and guiding wheels, said unit comprising:

a rack-shaft to be coupled to the guiding wheels of the vehicle;

an elongated first housing slidably containing a portion of the rack-shaft and having at one point along its length a coupling section for coupling the first housing to the lower end of the steering column of the vehicle such that the teeth of the rack-shaft are engageable with those of a pinion arranged on the steering column and linked to the steering handle of the vehicle;

an electric motor coaxially arranged around the rack-shaft to supply assisting power to the rack-shaft;

a ball screw mechanism having a nut section drivingly connected to the armature shaft of the electric motor and also drivingly connected to a screw section formed on the rack-shaft by ball members disposed between the nut section and the screw section to transmit the rotary power of the electric motor to the rack-shaft as assisting power for steering;

a second housing having a housing part containing another portion of the rack-shaft and rotatably supporting the nut section of the ball-and-screw mechanism and being disposed at an opposite longitudinal end of the steering unit relative to the coupling section, said housing part of the second housing radially surrounding and containing said nut section and ball members, said second housing being provided with a fitting section being cast integrally with said second housing and rigidly connected with the housing part and adapted for use in rigidly securing said second housing at said opposite longitudinal end of the steering unit to the main body of the vehicle; and, a fitting member separate from the coupling section adapted to be located adjacent the coupling section and for use in securing the first housing to the vehicle main body and including a quantity of elastic material for insertion between the first housing and the vehicle main body so that after the first housing is secured to the vehicle main body by said fitting member with said elastic material inserted between the first housing and the vehicle main body said first housing can resiliently move by way of the elastic material relative to the vehicle main body to reduce the transmission of noise from the steering unit to the inside space of the vehicle main body through the steering column.

* * * * *